(12) United States Patent
Kabata et al.

(10) Patent No.: US 10,877,436 B2
(45) Date of Patent: Dec. 29, 2020

(54) PARTICLE COLLECTING DEVICE AND IMAGE FORMING APPARATUS INCLUDING SAME

(71) Applicants: Toshiyuki Kabata, Kanagawa (JP); Shoji Sasaki, Kanagawa (JP)

(72) Inventors: Toshiyuki Kabata, Kanagawa (JP); Shoji Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/530,169

(22) Filed: Aug. 2, 2019

(65) Prior Publication Data

US 2020/0050144 A1 Feb. 13, 2020

(30) Foreign Application Priority Data

Aug. 10, 2018 (JP) .................................. 2018-151242

(51) Int. Cl.
*G03G 21/20* (2006.01)

(52) U.S. Cl.
CPC .................................. *G03G 21/206* (2013.01)

(58) Field of Classification Search
CPC .. G03G 15/052; G03G 15/0258; G03G 21/20; G03G 21/206; G03G 2221/1645
See application file for complete search history.

(56) References Cited

U.S. PATENT DOCUMENTS

| | | | | |
|---|---|---|---|---|
| 2007/0146827 | A1* | 6/2007 | Kakita | G03G 21/206 358/498 |
| 2010/0166451 | A1* | 7/2010 | Von Schischka | B01D 46/0032 399/98 |
| 2016/0195848 | A1 | 7/2016 | Sasaki | |
| 2018/0024462 | A1 | 1/2018 | Shimada et al. | |

FOREIGN PATENT DOCUMENTS

| | | |
|---|---|---|
| EP | 1650614 A2 | 4/2006 |
| JP | H07140858 a | 6/1995 |
| JP | 8-272269 | 10/1996 |
| JP | 2003084633 A | 3/2003 |
| JP | 2011-180236 | 9/2011 |
| JP | 2011-180340 | 9/2011 |
| JP | 2014-044238 | 3/2014 |
| JP | 2014-177996 | 9/2014 |
| JP | 2016-080935 | 5/2016 |
| JP | 2017-191227 | 10/2017 |
| JP | 2018-022130 | 2/2018 |
| JP | 2018-031943 | 3/2018 |

OTHER PUBLICATIONS

JP 2003084633 English machine translation, Kimura et al., Mar. 19, 2003 (Year: 2003).*
Extended European Search Report dated Jan. 15, 2020, issued in corresponding European Patent Application No. 19190101.6.
Atsushi Mizukoshi, et al., "Investigation of reaction products of ozone and organic compounds in a simulated aircraft cabin environment" Proceedings of the 2015 Academic Conference of the Society of Indoor Environment, Japan, p. 234-235.

* cited by examiner

*Primary Examiner* — Thomas S Giampaolo, II

(74) *Attorney, Agent, or Firm* — Harness, Dickey & Pierce, P.L.C.

(57) ABSTRACT

A particle collecting device includes an ozone exhaust path and an electrostatic filter. The ozone exhaust path is configured to exhaust ozone generated by an ozone generation device. The electrostatic filter is in a course of the ozone exhaust path.

13 Claims, 3 Drawing Sheets

| | UFP GENERATION SPEED<br>($3.5 \times 10^{11}$ PARTICLES/ 10 min OR LOWER) |
|---|---|
| COMPARATIVE EXAMPLE 3 | NOT SATISFIED |
| EXAMPLE 2 | SATISFIED |
| EXAMPLE 3 | SATISFIED |
| EXAMPLE 4 | SATISFIED |

PARTICLE COLLECTING DEVICE AND IMAGE FORMING APPARATUS INCLUDING SAME

CROSS-REFERENCE TO RELATED APPLICATION

This patent application is based on and claims priority pursuant to 35 U.S.C. § 119(a) to Japanese Patent Application No. 2018-151242, filed on Aug. 10, 2018, in the Japan Patent Office, the entire disclosure of which is hereby incorporated by reference herein.

BACKGROUND

Technical Field

Aspects of the present invention relate to a particle collecting device to collect particles, and an electrophotographic image forming apparatus, such as a copier, a printer, a facsimile machine, or a multifunctional peripheral of the foregoing capabilities, including the particle collecting device.

Related Art

In an image forming apparatus such as a copier or a printer, there is known a technology of exhausting ozone-free air by collecting (removing) ozone with an ozone filter in an exhaust path while flowing ozone, which is generated in a charging device (an ozone generation device) to charge a photoconductor drum (image bearer), along with air to an exhaust duct.

SUMMARY

In an aspect of the present invention, there is provided a particle collecting device that includes an ozone exhaust path and an electrostatic filter. The ozone exhaust path is configured to exhaust ozone generated by an ozone generation device. The electrostatic filter is in a course of the ozone exhaust path.

In another aspect of the present invention, there is provided an image forming apparatus that includes the particle collecting device.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
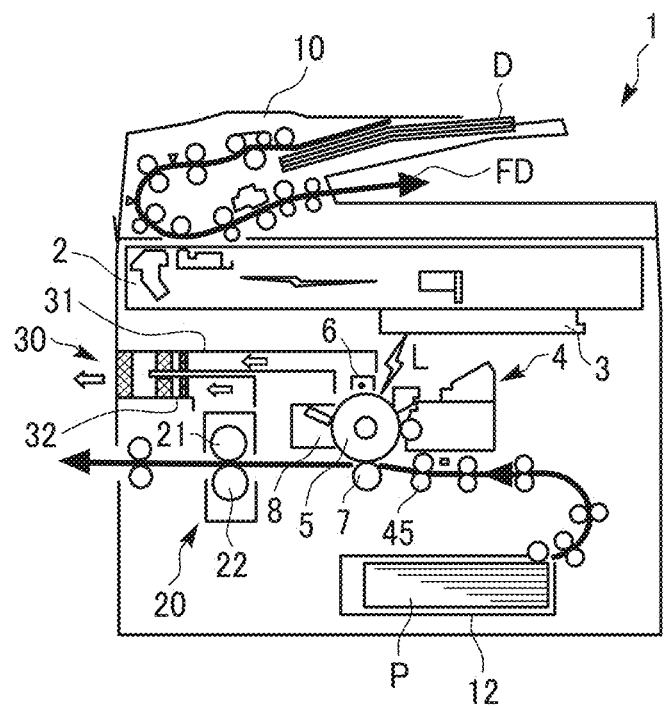
FIG. 1 is a schematic view of an entire configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Next, a description is given of embodiments of this disclosure, with reference to drawings. It is to be noted that identical parts are given identical reference numerals and redundant descriptions are summarized or omitted accordingly.

Now, a description is given of an overall configuration and operations of an image forming apparatus 1 according to an embodiment of this disclosure, with reference to FIG. 1. FIG. 1 is a schematic view of an overall configuration of the image forming apparatus 1 according to an embodiment of this disclosure. In FIG. 1, the image forming apparatus 1 is illustrated as an example of a copier. The image forming apparatus 1 includes a document reading device 2, and an exposure device 3. The document reading device 2 optically reads image information of an original document D. The exposure device 3 irradiates a photoconductor drum 5 with exposure light L based on the image information read with the document reading device 2. The image forming apparatus 1 further includes a developing device 4, a photoconductor drum 5, a charging device 6, a transfer device 7, and a cleaning device 8. The developing device 4 develops a latent image formed on the photoconductor drum 5 to form a toner image. The photoconductor drum 5 is an example of an image bearer. The charging device (charger) 6 is an example of an ozone generation device to charge a surface of the photoconductor drum 5. The transfer device 7 is, in this embodiment, a transfer roller to transfer the toner image formed on the photoconductor drum 5 onto a sheet P. The cleaning device 8 removes non-transferred toner remaining on the photoconductor drum 5. The image forming apparatus 1 further includes a document feeder 10, a sheet feeding device 12, a fixing device 20, a fixing roller 21, a pressing roller 22, a particle collecting device 30, and a timing roller pair (registration roller pair) 45. The document feeder 10 feeds an original document D set on the document feeder 10 to the document reading device 2. The sheet feeding device (in this embodiment, sheet feeding cassette) 12 stores sheets P, such as sheets of paper. The fixing device 20 is an example of a hot-air generator and heats the toner image (unfixed image) on the sheet P to fix the toner image on the sheet P. The fixing roller 21 is disposed in the fixing device 20. The pressing roller 22 is disposed in the fixing device 20. The particle collecting device 30 collects particles in the image forming apparatus 1. The timing roller pair 45 feeds the sheet P toward the transfer device 7 (a transfer nip).

With reference to FIG. 1, an operation of the image forming apparatus 1 in normal image formation is described below. The original document D is fed in a direction indicated by arrow FD from a document table of the document feeder 10 by multiple pairs of feeding rollers in the document feeder 10 and pass over the document reading device 2. At this time, the document reading device 2 optically reads image data of the original document D passing over the document reading device 2. Consequently, the image data optically scanned by the document reading device 2 is converted to electrical signals. The converted electrical signals are transmitted to the exposure device 3 (a writing device) by which the image is optically written. Then, the exposure device 3 irradiates the surface of the photoconductor drum 5 with the exposure light (laser light) L based on the image data of the electrical signals.

Meanwhile, the photoconductor drum 5 as the image bearer rotates in a clockwise direction in FIG. 1. After a series of predetermined image forming processes, e.g., a charging process, an exposing process, and a developing process is completed, a toner image corresponding to the image data is formed on the surface of the photoconductor drum 5. The image formed on the photoconductor drum 5 is transferred onto the sheet P conveyed by the timing roller pair 45 at a position (transfer nip) facing the transfer device 7.

For example, the photoconductor drum 5 rotates in the clockwise direction in FIG. 1. Then, the surface of the photoconductor drum 5 is uniformly charged at a position facing the charging device 6 (charging process). Thus, a charging potential is formed on the photoconductor drum 5. In the present embodiment, a corona discharge charger is used as the charging device 6. Thereafter, the surface of the charged photoconductor drum 5 reaches the irradiation position of the exposure light L. Then, an electrostatic latent image is formed on the surface of the photoconductor drum 5 based on the image information read by the document reading device 2 (exposure process). Thereafter, the surface of the photoconductor drum 5 on which the electrostatic latent image is formed reaches the position facing the developing device 4. Then, the toner is supplied from the developing device 4 onto the photoconductor drum 5 to develop the latent image on the photoconductor drum 5 (developing process). Thereafter, the surface of the photoconductor drum 5 had been subjected the developing process reaches the position facing the transfer device 7 (transfer nip). Then, at the position of the transfer device 7, the toner image formed on the photoconductor drum 5 is transferred onto the sheet P (transfer process). A transfer bias having a polarity different from a polarity of the toner is applied to the transfer device 7 (transfer roller). Then, the surface of the photoconductor drum 5 having been subjected to the transfer process reaches the position facing the cleaning device 8. Then, non-transferred toner remaining on the photoconductor drum 5 is removed and collected by the cleaning device 8 (cleaning process). Thereafter, the surface of the photoconductor drum 5 passes through a charge neutralizing device, and a series of image forming processes on the photoconductor drum 5 are completed.

On the other hand, the sheet P conveyed to the position (transfer nip) of the transfer device 7 operates as follows. First, the uppermost sheet of the sheet P stored in the sheet feeding device 12 is fed by a sheet feeding roller toward a conveyance path in which a plurality of conveyance roller pairs is arranged. Thereafter, the sheet P reaches the position of the timing roller pair 45. Then, the sheet P that has reached the position of the timing roller pair 45 is fed toward the transfer device 7 (transfer nip) in timing with the image formed on the photoconductor drum 5.

Then, after passing through the position of the transfer device 7, the sheet P having been subjected to the transfer process passes through the conveyance path and reaches the fixing device 20. The sheet P having reached the fixing device 20 (the sheet P on which an unfixed image is carried) is fed into between the fixing roller 21 (including a heater as a heat source) and the pressing roller 22. The toner image is fixed by the heat received from the fixing roller 21 and the pressure received from both the fixing roller 21 and the pressing roller 22. The sheet P on which the toner image has been fixed is sent from a fixing nip between the fixing roller 21 and the pressing roller 22 and ejected from the image forming apparatus 1. Thus, a series of image forming processes is completed.

Figure 2:
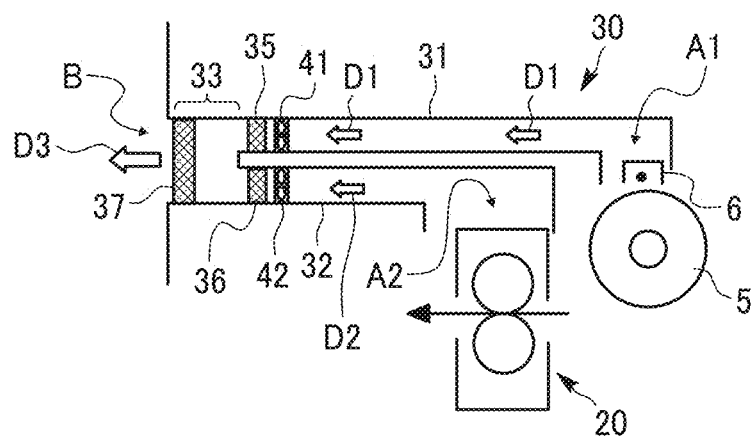
FIG. 2 is a block diagram of a particle collecting device.
Figure 3:
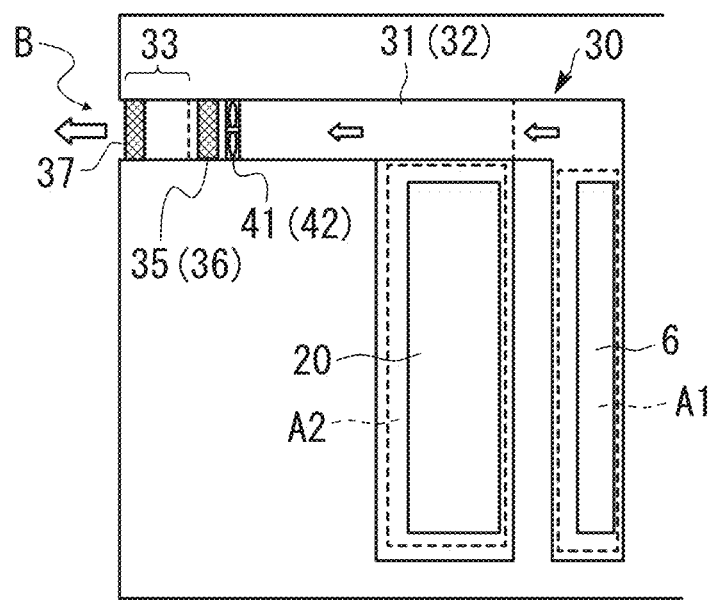
FIG. 3 is a schematic top view of the particle collecting device in a width direction.

Next, a description is given of the particle collecting device 30 installed in the image forming apparatus 1 according to the present embodiment. Referring to FIGS. 1 to 3, the image forming apparatus 1 according to the present embodiment includes the particle collecting device 30 to collect particles present in the particle collecting device 30 prevent the particles from being emitted from the particle collecting device 30. The particle collecting device 30 in the present embodiment collects, in particular, 7 to 300 nm ultrafine particles (hereinafter referred to as "UFPs" as appropriate) defined by a Blue Angel (BA) standard (RAL-UZ171).

The particle collecting device 30 in the present embodiment includes an ozone exhaust path (a first duct 31 and a merging duct 33) to exhaust ozone generated in an ozone generation device (in this embodiment, for example, the charging device 6 that charges the photoconductor drum 5 as an image bearer). An electrostatic filter 37 is disposed in a course of the ozone exhaust path (the first duct 31 and the merging duct 33). When ozone is generated by the high voltage discharge of the charging device 6 during image formation (the charging process), organic substances around the charging device 6 (for example, various members constituting the image forming device and substances, such as toner and paper dust, floating around the photoconductor drum 5) partially turn to UFPs ionized by ozone. Such a phenomenon is also consistent with the content disclosed in Atsushi Mizukoshi et al., "Investigation of reaction products of ozone and organic compounds in a simulated aircraft cabin environment," Proceedings of 2015 Annual Meeting of the Society of Indoor Environment" (2015): 234-235.

Figure 4A:
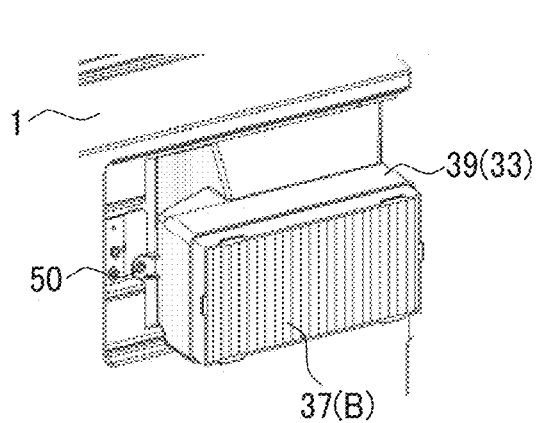
FIG. 4A is a perspective view of a state in which an electrostatic filter is disposed in an image forming apparatus.
Figure 4B:
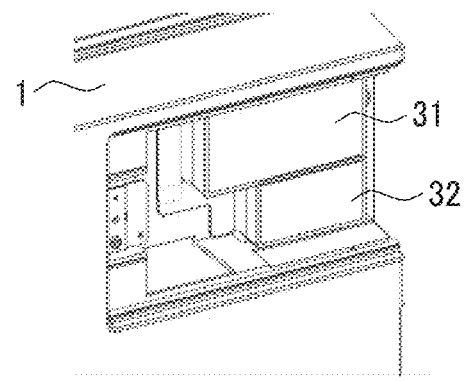
FIG. 4B is a perspective view of a state in which the electrostatic filter is removed from the image forming apparatus.

In the present embodiment, the electrostatic filter 37 is disposed in a course of the ozone exhaust path (including the first duct 31 and the merging duct 33) between an inlet A1 and an outlet B. In particular, in the present embodiment, the electrostatic filter 37 is detachably installed at the position of the outlet B of the ozone exhaust path (the merging duct 33) (see FIGS. 4A and 4B). The electrostatic filter 37 has a very fine mesh of filter fibers. The filter fibers are positively and negatively charged constantly. On the other hand, UFPs generated together with ozone by the charging device 6 as the ozone generation device is in an ionized state. Accordingly, although UFPs are hardly collected by an ozone filter 35 described later, UFPs can be electrostatically sufficiently captured by the electrostatic filter 37.

Thus, even if a negative ion generator and a positive ion generator are installed in the ozone exhaust path (including the first duct 31 and the merging duct 33), the above-described configuration can reduce UFPs emitted to the outside of the image forming apparatus 1. That is, the above-described configuration can effectively collect UFPs without increasing the cost and size of the particle collecting device 30 (image forming apparatus 1). In the present embodiment, the charging device 6 uses a corona discharge charger that is likely to generate ozone and uses, as the transfer device 7, a transfer roller of a roller application type that is unlikely to generate ozone. Therefore, the inlet A1 of the ozone exhaust path (including the first duct 31 and the merging duct 33) is disposed in the vicinity of the charging device 6. For example, in the case of using, as the transfer device 7, a corona discharge type transfer charger that is likely to generate ozone, an inlet of an ozone exhaust path is also preferably provided in the vicinity of the transfer device 7. In addition, in a case in which another ozone generation device is in the image forming apparatus 1 (for example, a case in which a pre-transfer charger is in the image forming apparatus 1), an inlet of an ozone exhaust path is also preferably provided in the vicinity of the ozone generation device. In addition, even when a charging roller or a transfer roller that is unlikely to generate ozone is used, the amount of ozone generated is larger in a high-speed image forming apparatus with high printing speed than an image forming apparatus with low printing speed. Therefore, an inlet of an ozone exhaust path is preferably provided in the vicinity of the ozone generation device (the charging roller or the transfer roller).

Hereinafter, the configuration and operation of the particle collecting device 30 in the present embodiment is further described. In the present embodiment, the particle collecting device 30 includes the first duct 31, a second duct 32, and the merging duct 33. The first duct 31 exhausts air from the vicinity of the charging device 6 as an ozone generation device to the outside of a body of the image forming apparatus 1. The first duct 31 includes the inlet A1 in the vicinity of the charging device 6 at an upstream end of the first duct 31 in a direction indicated by arrow D1 in FIG. 2 (hereinafter, the direction D1). A first suction fan 41 and the ozone filter 35 are disposed in a course of the first duct 31. A downstream end of the first duct 31 in the direction D1 is connected to the merging duct 33. The second duct 32 exhausts air from the vicinity of the fixing device 20 being a heated air generation device to the outside of the body of the image forming apparatus 1. The second duct 32 includes an inlet A2 in the vicinity of the fixing device 20 at an upstream end of the second duct 32 in a direction indicated by arrow D2 in FIG. 2 (hereinafter, the direction D2). A second suction fan 42 and a volatile organic compound (VOC) filter 36 are disposed in a course of the second duct 32. A downstream end of the second duct 32 in the direction D2 is sucked is connected to the merging duct 33. The first duct 31 and the second duct 32 are connected to an upstream end of the merging duct 33 in a direction indicated by arrow D3 in FIG. 2 (hereinafter, the direction D3). The electrostatic filter 37 is disposed in the course of the merging duct 33. The outlet B is disposed at the downstream end of the merging duct 33 in the direction D3.

That is, the ozone exhaust path is constituted of the first duct 31 and the merging duct 33. The ozone filter 35 that decomposes the ozone generated by the high voltage discharge of the charging device 6 is installed in the course of (the first duct 31 of) the ozone exhaust path (the first duct 31 and the merging duct 33) and upstream from the electrostatic filter 37 in the direction D1. The ozone filter 35 may be a known ozone filter. In the present embodiment, the ozone filter 35 including manganese oxide as catalyst is used. Even if the UFPs ionized by ozone pass through the ozone filter 35 and the ozone is decomposed, the ionized state does not change, thus preventing decrease of the collection efficiency of the UFPs by the above-mentioned electrostatic filter 37.

Further, since ozone is decomposed by the ozone filter 35 on the upstream side of the electrostatic filter 37, UFPs are unlikely to be further generated by ozone, thus enhancing the collection efficiency of the UFPs by the electrostatic filter 37. The first suction fan 41 as a suction fan to generate an air flow in the direction indicated by arrow D1 in FIG. 2 is installed in the course of (the first duct 31 of) the ozone exhaust path (including the first duct 31 and the merging duct 33) and on the upstream side of the ozone filter 35. With such a configuration, in the ozone exhaust path (including the first duct 31 and the merging duct 33), air including a reduced amount of ozone is exhausted to the outside of the image forming apparatus 1 while ozone generated by high-pressure discharge of the charging device 6 is decomposed by the ozone filter 35. Furthermore, as described above, in the ozone exhaust path (including the first duct 31 and the merging duct 33), air including a reduced amount of UFPs is exhausted to the outside of the image forming apparatus 1 while the UFPs generated together with the ozone by the high-pressure discharge of the charging device 6 is collected (removed) by the electrostatic filter 37.

The second duct 32 and the merging duct 33 act as a heated-air exhaust path to exhaust heated air (hot air or high temperature air) generated by the fixing device 20 as a heated-air generation device. Therefore, the ozone exhaust path and the heated-air exhaust path are provided with a merging exhaust path (the merging duct 33) at which respective downstream sides of the ozone exhaust path and the heated-air exhaust path merge. The electrostatic filter 37 is disposed in a course of the merging exhaust path (the merging duct 33).

The heated-air exhaust path (including the second duct 32 and the merging duct 33) exhausts air (exhausts heat) from the vicinity of the fixing device 20 to the outside of the image forming apparatus 1. The VOC filter 36 to collect VOCs generated from the fixing device 20 is disposed in a course of the heated-air exhaust path (including the second duct 32 and the merging duct 33) and at a position (in the second duct 32) other than the merging exhaust path (the merging duct 33). The VOC filter 36 may be a known VOC filter. In the second duct 32, the second suction fan 42 to generate an air flow in the direction indicated by arrow D2 in FIG. 2 is disposed at a position upstream from the VOC filter 36 in the direction D2. With such a configuration, heat generated by the fixing device 20 is exhausted to the outside of the image forming apparatus 1 while volatile organic compounds generated by the fixing process of the fixing device 20 are collected (removed) by the VOC filter 38 in the heated-air exhaust path.

Here, UFPs may include not only particles generated together with ozone by the charging device 6 as the ozone generation device described above but also particles at the position of the fixing device 20 (as the heated-air generation device). For example, UFPs generated by the fixing device 20 are considered to be fine particles obtained by cooling and aggregating high boiling point substances (for example, low molecular weight siloxine, paraffin, etc.), which are contained in the fixing device 20 and toner, having been heated by heat energy in the fixing process. However, the UFPs generated in the heated-air generation device (fixing device 20) in such a way are mostly unionized unlike the UFPs generated in the ozone generation device (charging device 6). Such UFPs are also so small in particle size that the UFPs can hardly be collected by the VOC filter 38.

Therefore, in the present embodiment, ionized UFPs flowing in the ozone exhaust path and unionized UFPs flowing in the heated-air exhaust path are merged in the merging exhaust path (merging duct 33). Accordingly, as the ionized UFPs and the unionized UFPs aggregate and becomes large so that the ionized UFPs take in the unionized UFPs. The UFPs thus aggregated remains in the ionized (charged) state and have increased particle sizes, thus allowing efficient collection by the electrostatic filter 37 disposed (at the position of the outlet B) in the course of the merging exhaust path. That is, even if an electrostatic filter is disposed in the course of the heated-air exhaust path without a merging exhaust path, UFPs flowing in the heated-air exhaust path would be hardly ionized. Accordingly, the UFPs would not be sufficiently collected by the electrostatic filter in electrostatic manner, thus causing many of the UFPs to be released out of the image forming apparatus 1. Hence, in the present embodiment, the merging exhaust path is provided at which the ozone exhaust path and the heated-air exhaust path merge, and unionized UFPs are aggregated and ionized with ionized UFPs in the merging exhaust path. Such a configuration allows UFPs to be electrostatically collected by the electrostatic filter 37, thus preventing most of the UFPs from being exhausted outside the image forming apparatus 1.

Here, it is conceivable to connect the downstream end of the ozone exhaust path to the upstream end of the heated-air exhaust path to merge directly ionized UFPs at the position of the heated-air generation device with heated air (high-temperature air including unionized UFPs) generated by the heated-air generation device (fixing device 20). However, in such a configuration, the ozone introduced from the ozone exhaust path is heated to a high temperature by the heated-air generation device, the reactivity of the ozone would be enhanced and more UFPs would be generated. Moreover, in a case in which, in the above-described configuration, an ozone filter is disposed in the ozone exhaust path and the air (air containing ionized UFPs) having been subjected to ozone collection is merged to the position of the heated-air generation device, the heated air of the heated-air generation device would hamper the aggregation of ionized UFPs and unionized UFPs, which makes the collection by the electrostatic filter difficult. On the other hand, in the present embodiment, the downstream side of the ozone exhaust path is connected to the downstream side of the heated-air exhaust path to form the merging exhaust path, and ionized UFPs and unionized UFPs are merged in the merging exhaust path. Such a configuration allows the electrostatic filter 37 to efficiently and sufficiently collect both of the ionized UFPs and the unionized UFPs without causing an increase of UFPs due to a high temperature of ozone and an inhibition of aggregation of both of the ionized UFPs and the unionized UFPs due to high temperature.

Here, in the present embodiment, the ozone filter 35 is disposed at the position (in the path of the first duct 31) other than the merging exhaust path (the merging duct 33) in the course of the ozone exhaust path (including the first duct 31 and the merging duct 33). Such a configuration can enhance the collection efficiency of UFPs by the electrostatic filter 37, as compared with the case in which the electrostatic filter 37 is installed in the merging exhaust path (the merging duct 33) (the case in which ozone is decomposed by the ozone filter after unionized UFPs and ionized UFPs are merged). For example, in the merging exhaust path (the merging duct 33), the average particle diameter of unionized UFPs exhausted from the second duct 32 is increased to several tens of nm to several hundreds of nm by the aggregation of the unionized UFPs and the ionized UFPs. However, when the concentration of ozone contained in the ambient air is too high when the UFPs are aggregated as described above, substances contained in the air might also be micronized and UFPs might increase. Hence, in the present embodiment, the ozone filter 35 is disposed in the first duct 31 to reduce the concentration of ozone in the air flowing from the first duct 31 into the merging exhaust path (the merging duct 33). While reducing new UFPs generated in the merging exhaust path (the merging duct 33), such a configuration can facilitate the aggregation and the increase in particle size of UFPs to enhance the collection efficiency of UFPs by the electrostatic filter 37.

Here, in the present embodiment, the first suction fan 41 is disposed at the position (in the path of the first duct 31) other than the merging exhaust path (the merging duct 33) in the course of the ozone exhaust path (including the first duct 31 and the merging duct 33). The second suction fan 42 is disposed at a position (in the path of the second duct 32) other than the merging exhaust path (the merging duct 33) in the course of the heated-air exhaust paths (the second duct 32 and the merging duct 33). Such a configuration can facilitate the aggregation of ionized UFPs flowing from the first duct 31 and unionized UFPs flowing from the second duct 32 in the merging exhaust path (the merging duct 33), as compared to the case in which a suction fan is disposed in the merging exhaust path. That is, if the suction fan is disposed in the merging exhaust path, both the ionized UFPs and the unionized UFPs are likely to flow downstream before both the UFPs are sufficiently aggregated. Consequently, the UFPs might not be sufficiently collected by the electrostatic filter. On the other hand, in the present embodiment, since the first suction fan 41 and the second suction fan 42 are disposed sufficiently upstream from the merging exhaust path, thus preventing such a failure.

In addition, since the first suction fan 41 and the second suction fan 42 are disposed upstream from any of the ozone filter 35 and the VOC filter 36, the operability in attachment and detachment of the ozone filter 35 and the VOC filter 36 to and from the image forming apparatus 1 in replacement work (or maintenance work) can be enhanced. That is, the replacement work (or maintenance work) of the ozone filter 35 and the VOC filter 36 can be performed even without performing attachment and detachment of the first suction fan 41 and the second suction fan 42. In particular, as illustrated in FIG. 4, the electrostatic filter 37 is held by the holding cover 39 (also acting as part of the merging exhaust path) and detachably attached by the fastening of the screw 50 so that the electrostatic filter 37 is exposed together with the holding cover 39 to the outside of the image forming apparatus 1. Such a configuration can facilitate replacement work (or maintenance work) of the electrostatic filter 37.

Figures 5, 6:
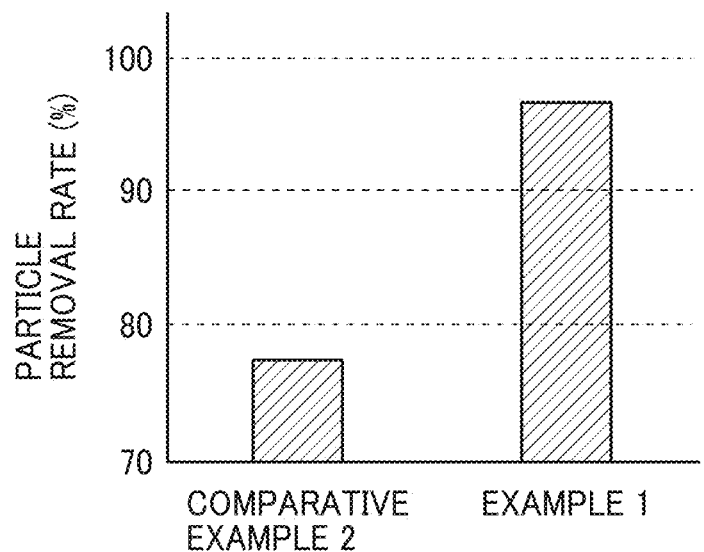
FIG. 5 is a graph of particle removal rates.
FIG. 6 is a table of results of measurement of the generation rate of UFPs.

Hereinafter, experiments conducted by the inventors of the present application and results of the experiments are described with reference to FIGS. 5 and 6. First, an experiment and results of the experiment illustrated in FIG. 5 are described. In Example 1, the image forming apparatus 1 is used that includes the particle collecting device 30 according to the present embodiment described with reference to FIGS. 1 to 3 and so on. On the other hand, in Comparative Example 1, an image forming apparatus is used in which the electrostatic filter 37 is removed from the particle collecting device 30 of Example 1. In addition, in Comparative Example 2, an image forming apparatus is used in which an electrostatic filter is disposed only at the outlet of the second duct 32 in the image forming apparatus of Comparative Example 1. In each of Example 1 and Comparative Examples 1 and 2, the image forming apparatus 1 was set in a clean chamber having a volume of 5 m³ conforming to the BA standard. Printing operation (image forming operation)

was performed for ten minutes and the concentration of UFPs in the clean chamber was measured with the Fast Mobility Particle Sizer (FMPS) of Model 3091 manufactured by Tokyo Dylec Corporation. FIG. 5 presents the particle removal rates in Example 1 and Comparative Example 2 that were determined from the maximum concentration of UFPs in the clean chamber. The "particle removal rate" is defined by the following equation.

Particle removal rate=((maximum UFP concentration of Comparative Example 1)-(maximum UFP concentration of Example 1 or Comparative Example 2))/(maximum UFP concentration of Comparative Example 1)×100

As a result, as for Example 1 and Comparative Examples 1 and 2, as illustrated in FIG. 5, a sufficient particle removal rate of about 96% was confirmed in Example 1 and a particle removal rate of about 77%, which cannot be sufficient, was confirmed in the Comparative Example 2.

Next, an experiment and results of the experiment illustrated in FIG. 6 are described. In Comparative Example 3, an image forming apparatus is used in which the printing speed is increased by 6% with respect to the image forming apparatus of Comparative Example 2 described with reference to FIG. 5. Further, in Example 2, an image forming apparatus is used in which the printing speed is increased by 6% with respect to the image forming apparatus 1 of Example 1. In Example 3, an image forming apparatus is used in which the pressure loss of the electrostatic filter 37 is reduced by 12% from the image forming apparatus 1 of Example 1. Further, in Example 4, an image forming apparatus is used in which, instead of the electrostatic filter 37 installed in the merging duct 33 in Example 1, electrostatic filters are installed at the respective outlets of the first duct 31 and the second duct 32. FIG. 6 presents experimental results of measuring the exhaust rate (UFP generation rate) of UFPs exhausted to the outside of the image forming apparatus by the measurement method based on the BA standard described above for Comparative Example 3 and Examples 2 to 4.

As a result, as illustrated in FIG. 6, it was found that Examples 2 to 4 satisfied the above-mentioned BA standard ($3.5 \times 10^{11}$ particles/10 minutes or less) and Comparative Example 3 did not satisfy the BA standard. For example, in Comparative Example 2, the conversion value of the UFP generation rate described above was $6.3 \times 10^{11}$ particles/10 min and the BA standard was not satisfied. On the other hand, the conversion value of the UFP generation rate was $1.7 \times 10^{11}$ particles/10 min in Example 2, and the conversion value of the UFP generation rate was $1.9 \times 10^{11}$ particles/10 min in Example 3. In Example 4, the conversion value of the UFP generation rate was $3.4 \times 10^{11}$ particles/10 min. All of Examples 2 to 4 satisfied the BA standard. The above-described experimental results also confirms the effect of the above-described embodiment.

As described above, the particle collecting device 30 according to the present embodiment includes the ozone exhaust path (the first duct 31 and the merging duct 33), through which the ozone generated by the charging device 6 (ozone generation device) is exhausted, and the electrostatic filter 37 disposed in the course of the ozone exhaust path (including the first duct 31 and the merging duct 33). Such a configuration can sufficiently and efficiently collect UFPs generated with the ozone by the charging device 6 (ozone generation device).

Although the particle collecting device 30 is installed in the monochrome image forming apparatus 1 in the present embodiment, the particle collecting device according to an embodiment may be installed in a color image forming apparatus. Further, in the present embodiment, the inlet B of the ozone exhaust path (including the first duct 31 and the merging duct 33) (and the heated-air exhaust path (including the second duct 32 and the merging duct 33)) is disposed at a lateral side of the image forming apparatus 1. However, the position of the outlet B is not limited to such a position. For example, the outlet B may be disposed at a back side of the image forming apparatus 1 (that is, a side opposite to a front side at which a user operates the image forming apparatus 1). Such a configuration can also exhibit a similar effect to the effect of the above-described embodiment.

Further, although the particle collecting device 30 is installed in the image forming apparatus 1 in the present embodiment, embodiments of the present disclosure are not limited to such a configuration. The particle collecting device may be disposed in any apparatus different from the image forming apparatus as long as particles are generated together with ozone by an ozone generation device. In the present embodiment, the particle collecting device 30 is disposed inside the image forming apparatus 1. In some embodiments, the particle collecting device 30 may be disposed outside the image forming apparatus 1. Such a configuration can also exhibit a similar effect to the effect of the above-described embodiment.

In the present embodiment, a corona discharge type charger is used as the charging device 6. In some embodiments, a roller application type charging roller can also be used as the charging device. In the present embodiment, a thermal-heater-type fixing device using a heater as a heat source is used as the fixing device 20. In some embodiments, the fixing device may be of an electromagnetic induction heating type including an exciting coil or a resistance heating type including a resistance heating element. Further, in the present embodiment, one first suction fan 41 and one second suction fan 42 are disposed in the ozone exhaust path and the heated-air exhaust path, respectively. The number of suction fans is not limited thereto. Such a configuration can also exhibit a similar effect to the effect of the above-described embodiment.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims. For example, the number, position, shape, and so on of the above-described components are not limited to the number, position, shape, and so on of the above-described embodiment unless in particular specified but may be any suitable number, position, shape, and so on.

Note that, in the present disclosure, the expression "in the course of . . . path" means any position from the upstream end to the downstream end of the path (including the upstream end and the downstream end).

The invention claimed is:
1. A particle collecting device comprising:
   an ozone exhaust path configured to exhaust ozone generated by an ozone generation device;
   a heated air exhaust path configured to exhaust heated air generated by a heated air generation device;

a merging exhaust path,
  wherein a downstream side of the ozone exhaust path and a downstream side of the heated air exhaust path merge at the merging exhaust path;
an electrostatic filter in a course of the merging exhaust path; and
an ozone filter in a course of the ozone exhaust path upstream of the merging exhaust path and not in the course of the heated air exhaust path.

2. The particle collecting device according to claim 1, further comprising a suction fan in the course of the ozone exhaust path.

3. An image forming apparatus comprising the particle collecting device according to claim 1.

4. The image forming apparatus according to claim 3, further comprising:
  a fixing device configured to heat a toner image to fix the toner image on a sheet.

5. The image forming apparatus according to claim 4, further comprising:
  a volatile organic compound filter at a position other than the merging exhaust path in the course of the heated air exhaust path.

6. The image forming apparatus according to claim 4, further comprising:
  a first suction fan at a position other than the merging exhaust path in the course of the ozone exhaust path; and
  a second suction fan at a position other than the merging exhaust path in the course of the heated air exhaust path.

7. The image forming apparatus according to claim 3, further comprising:
  an image bearer, wherein
  the ozone generation device is a charging device configured to charge the image bearer.

8. The particle collecting device according to claim 1, further comprising:
  a volatile organic compound filter at a position other than the merging exhaust path in the course of the heated air exhaust path.

9. The particle collecting device according to claim 1, further comprising:
  a first suction fan at a position other than the merging exhaust path in the course of the ozone exhaust path; and
  a second suction fan at a position other than the merging exhaust path in the course of the heated air exhaust path.

10. The particle collecting device according to claim 1, wherein
  the electrostatic filter comprises a mesh of filter fibers, and
  the filter fibers are positively and negatively charged continuously.

11. The particle collecting device according to claim 1, further comprising:
  a holding cover configured to,
    hold the electrostatic filter,
    attach to the merging exhaust path, and
    detach from the merging exhaust path.

12. An image forming apparatus comprising:
  a fixing device configured to heat a toner image to fix the toner image on a sheet; and
  a particle collecting device including,
    an ozone exhaust path configured to exhaust ozone generated by an ozone generation device,
    a heated air exhaust path configured to exhaust heated air generated by a heated air generation device,
    a merging exhaust path,
      wherein a downstream side of the ozone exhaust path and a downstream side of the heated air exhaust path merge at the merging exhaust path,
    an electrostatic filter in a course of the merging exhaust path,
    an ozone filter at a position other than the merging exhaust path in a course of the ozone exhaust path, and
    a volatile organic compound filter at a position other than the merging exhaust path in the course of the heated air exhaust path.

13. A particle collecting device comprising:
  an ozone exhaust path configured to exhaust ozone generated by an ozone generation device;
  a heated air exhaust path configured to exhaust heated air generated by a heated air generation device;
  a merging exhaust path,
    wherein a downstream side of the ozone exhaust path and a downstream side of the heated air exhaust path merge at the merging exhaust path;
  an electrostatic filter in a course of the merging exhaust path;
  an ozone filter at a position other than the merging exhaust path in a course of the ozone exhaust path; and
  a volatile organic compound filter at a position other than the merging exhaust path in the course of the heated air exhaust path.

* * * * *